United States Patent
Smith et al.

[11] Patent Number: 5,848,192
[45] Date of Patent: Dec. 8, 1998

[54] METHOD AND APPARATUS FOR DIGITAL DATA COMPRESSION

[75] Inventors: Gerald R. Smith, Farmington; Robert C. Kidd, Ann Arbor, both of Mich.

[73] Assignee: Unisys Corporation, Blue Bell, Pa.

[21] Appl. No.: 296,068

[22] Filed: Aug. 24, 1994

[51] Int. Cl.$^6$ .............................. G26K 9/36; G26K 9/00
[52] U.S. Cl. .................. 382/232; 382/246; 382/239; 382/234
[58] Field of Search ............................ 375/377; 382/234, 382/239, 246, 426, 232

[56] References Cited

U.S. PATENT DOCUMENTS

| | | |
|---|---|---|
| 4,843,632 | 6/1989 | Lee et al. . |
| 5,095,374 | 3/1992 | Klein et al. ............................. 382/234 |
| 5,109,433 | 4/1992 | Notenboom . |
| 5,267,051 | 11/1993 | Dellert et al. ........................... 382/234 |
| 5,287,420 | 2/1994 | Barrett . |
| 5,313,534 | 5/1994 | Burel . |
| 5,339,368 | 8/1994 | Higgins-Luthman ................... 382/239 |
| 5,479,527 | 12/1995 | Chen . |

*Primary Examiner*—Wellington Chin
*Assistant Examiner*—Jean B Corrielus
*Attorney, Agent, or Firm*—John J. McCormack; Mark T. Starr

[57] ABSTRACT

A system for processing a stream of digital bit sets, each related to a different subject in a passing array, and including an arrangement for compressing the bit-sets and sending the results to an utilization stage; plus: a preprocessing stage for distributing each bit set in N parallel bit-compression paths, with all input sent to a common input buffer feeding these paths and each compression path being adapted to execute a prescribed first compression to ascertain "initial factors", and then a prescribed second compression to use the initial factors, with the second compression values selected according to "word count" factors derived from results of the first compression, and to thus provide a prescribed time-compressed output to the utilization stage; with both compressions performed according to JPEG standards; and the second compressions performed using prescribed selected QM and Huffman table values, and with a post processor stage to accept the compressed; data as 32-bit output and funnel it down to 16-bit output presented to the utilization stage.

16 Claims, 8 Drawing Sheets

METHOD AND APPARATUS FOR DIGITAL DATA COMPRESSION

RELATED PATENT

A related application, U.S. Ser. No. 296/578, filed 26 Aug. 1994 issued as U.S. Pat. No. 5,528,705 on 18 Jun. 1996.

FIELD OF THE INVENTION

This invention relates to the processing of digital data and, more particularly, to a method and apparatus for compression of digital data.

BACKGROUND OF THE INVENTION

Workers in the art of developing and processing digital data signals are aware that it is becoming ever more important to compress a stream of such signals, especially when it must be transferred (e.g., over a network of workstations). Commonly, such a stream is pre-processed preparatory to such compression. An object hereof is to preprocess such signals in aid of better compression thereof. A related object is to do so for video data. A more particular object is to do so for image data which is presented in a multi-bit data stream, for compressing and reducing the bits, and sending the results to utilization means, preferably in an arrangement which comprises a preprocessing (buffer) stage for presenting the data stream in two parallel bit-streams, plus a compression stage providing two parallel like compression paths for the in/out streams via a prescribed first compression-processing and then via a prescribed second compression-processing to provide a prescribed time-compressed output to the utilization means. A related object is to execute such compression in "real time" and according to JPEG standards. Still another object is to execute such compression on a single two-pass Printed Circuit board.

BRIEF DESCRIPTION OF THE DRAWINGS

For a more complete understanding of the present invention, relative to the advantages thereof, reference may be made to the following detailed description, taken in conjunction with the accompanying drawings in which:

FIG. 2 is a diagrammatic representation of preprocessing/compression steps for sample item images with a system as in FIG. 1A, while

DETAILED DESCRIPTION

Figure 1:
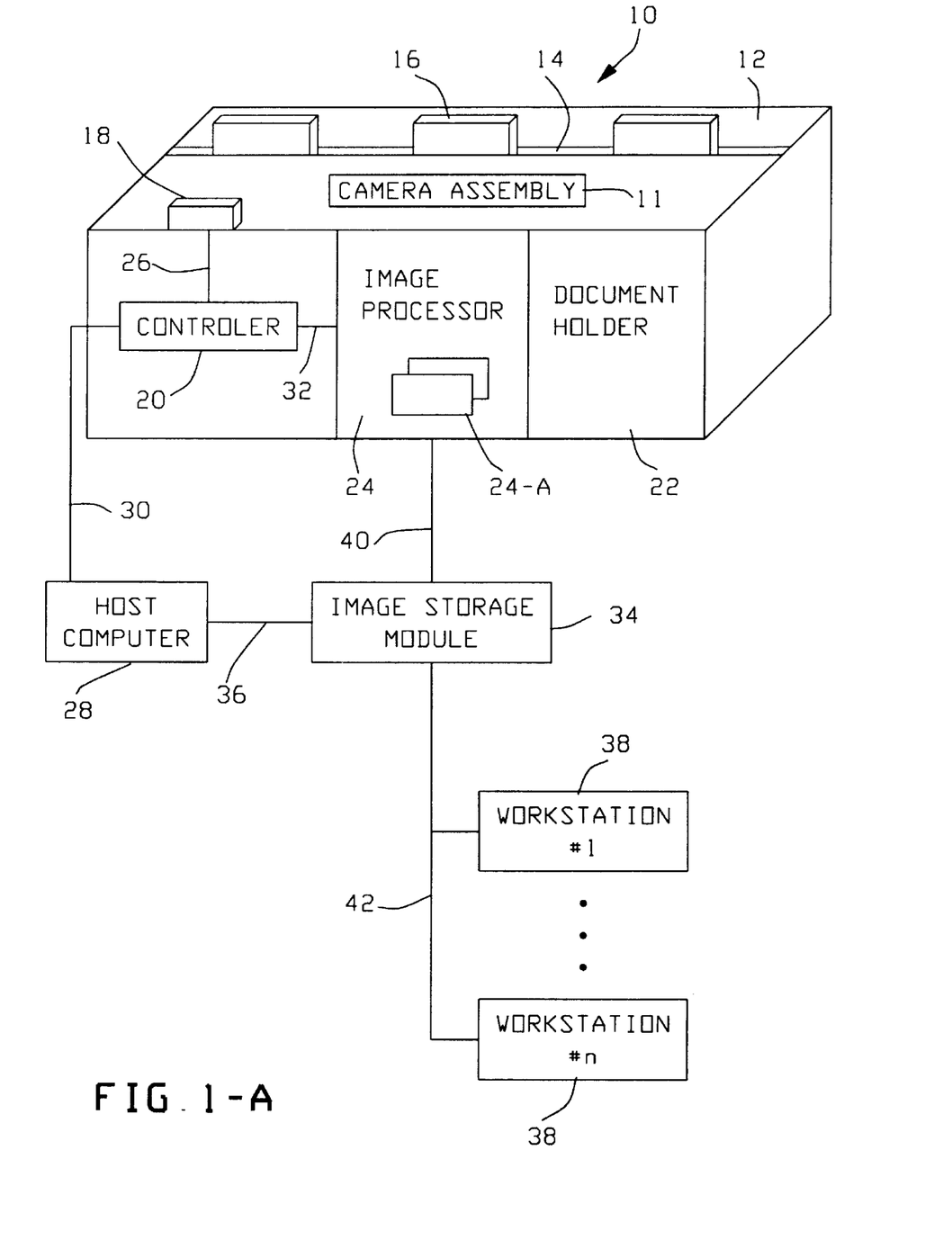
FIG. 1A is a block diagram of an item sorting system including image processing apparatus apt for use in accordance with the teachings of this invention.
FIG. 3 is a block diagram of a related array and FIG. 1B is a block diagram of a dual path Histogram/Compressor embodiment for use therein.

System Overview:

Referring now to FIG. 1A, there is shown a Financial Item Sorting System 10 having a typical Item Sorter 12 which, in the preferred embodiment of this invention, is a Model DP 1800 sorter which is manufactured by the Unisys Corporation of Blue Bell, Pa.

Sorter 12 contains a Track 14 for transport of Financial Items 16 to be processed—e.g., by a typical Magnetic Character Reader 18 and a typical Magnetic Character Reader Controller 20. Additionally, Sorter 12 contains an Item Holder 22, a Camera Assembly 11, and an Image Processor 24 apt for use in accordance with the teachings of the preferred embodiment of this invention.

Controller 20 is coupled to the Reader 18 by signals on a Bus 26, to a Host Computer 28 by signals on a Bus 30, and to Image Processor 24 by signals on a Bus 32. Computer 28 is coupled to an Image Storage Module 34 by signals on a Bus 36; Image Storage Module 34 is also coupled to the Image Processor 24 and to a plurality of Workstations 38 by signals on Busses 40 and 42, respectively. Additionally, Camera Assembly 11 is coupled to the Image Processors 24 by signals on a suitable bus.

In operation, Items 16 sequentially pass Reader 18 which reads a typical magnetic code appearing upon each of the Items 16. The code read-out is then sent to Computer 28, by signals on Bus 30, for storage therein and to Image Processor 24, by signals on the Bus 32. As each Item 16 further travels along Track 14, it passes Camera System 11 which captures an image of the item (e.g., a passing document) and outputs a digital representation of the image on Bus 82 to the Image Processor 24. This digital representation comprises a plurality of image pixels having an intensity represented by an "intensity-number" between 0 and 255. Image Processor 24 then processes this digitized image and sends the associated signals, via Bus 40, to the Image Storage Module 34 for storage therein. After this, the documents are then sorted, by a Sorter 10 (not shown), in the usual way and are held within one or more Document Holders 22 (or Sort Pockets).

After a typical block of Items 16 have been processed in this manner, an operator at one of the Workstations 38, may, via signals on Bus 42, request the aforementioned image bits from Storage Module 34. These bits are then downloaded to a Workstation 38, via Bus 42, along with their associated identifying magnetic code data obtained from Host Computer 28.

After these bit sets of images are captured by a Workstation 38, an operator may electronically enter associated data (e.g., check dollar-amount) with a given document-image and electronically resolve any difficulties; (e.g., an error in reading the magnetic code thereon) entering and storing the needed correction for the image. Each digitized image and its associated data and corrections then form a single corrected, completed electronic computerized record which can then be sent to Storage Module 34, via Bus 42. Thereafter it may be accessed for use in automatically inscribing associated data (e.g., dollar amount, corrections) upon the stored Items 16. In this way, item Sorting System 10 substantially eliminates the manual handling of Items 16 when an associated dollar amount is placed thereon, thereby increasing the efficiency and timeliness of sorting and processing.

Compression Stages:

Within Image Processor 24 in FIG. 1A is placed one of "n" JPEG processing/compression Stages (24-A) according to a feature hereof. Two of these JPEG processing/compression paths are preferably implemented on a Histogram/Compression printed circuit board assembly (PCBA) shown in FIG. 1B.

Image Processor 24 of FIG. 1A is preferably characterized by an Image Digitizer Unit (D of FIG. 2) for analog to digital conversion of the captured image, a Normalizer/Scaler (N/S Unit FIG. 2) for normalization and scaling of the video image, a set of "n", parallel JPEG Processing/Compression Units (J1 etc. of FIG. 2 and 24-A of FIG. 1A) for image processing/JPEG compression and a JPEG Compressed Data Buffer Unit (JCDB in FIG. 2) for collection and temporary storage of compressed images from the JPEG Processing/Compression Units. [Note "JPEG" refers to the compression standard by the "Joint Photographic Experts Group".]

These functions are implemented especially to meet the performance requirements of a high speed check process (imaging) system and to minimize the cost of the system by reducing the amount of "parallel hardware" needed to compress images. A preferred "dual" Processing/Compression Stage (for JPEG) is indicated in FIG. 1B.

The JPEG compression hardware performs image processing on a 128 grey level, scaled image before executing a two-pass JPEG compression. Scaling is nominally at 137.5 dpi but can range from 137.5 dpi to 50 dpi in steps of 12.5 dpi. This two-pass compression is designed—according to this feature—to reduce images to a predictable "packet size" apt for use in the entire High-Speed Check Imaging System. These functions of the JPEG "P/C" (Processing/Compression) hardware, (detailed below) must be performed, here, in real time on check images as they move down a high-speed Check Sorter Track at an approximate rate of 1800 checks per minute.

It is not possible, within the environment of the high-speed Check Imaging System (detailed below), for a single JPEG "P/C" (Processing/Compression) path to process every check in real time. Therefore, multiple JPEG "P/C" paths, operating in parallel, are needed. To reduce the time required for each processing/compression path to operate on an image (and therefore reduce the number of parallel paths needed to maintain system performance), many of the required functions of the JPEG "P/C" path have been implemented in hardware. The detailed explanation of each of these functions is described below.

System Environment

A JPEG "P/C" (Process/Compression) path as here contemplated, will perform image processing and real time JPEG compression of normalized and scaled images of documents (e.g. checks) captured in a Check Sorter at an average rate of 1800 checks per minute. The diagram in FIG. 2 indicates conditions under which each JPEG "P/C" path preferably operates and the performance required of such a unit to maintain overall system performance.

Figure 2:
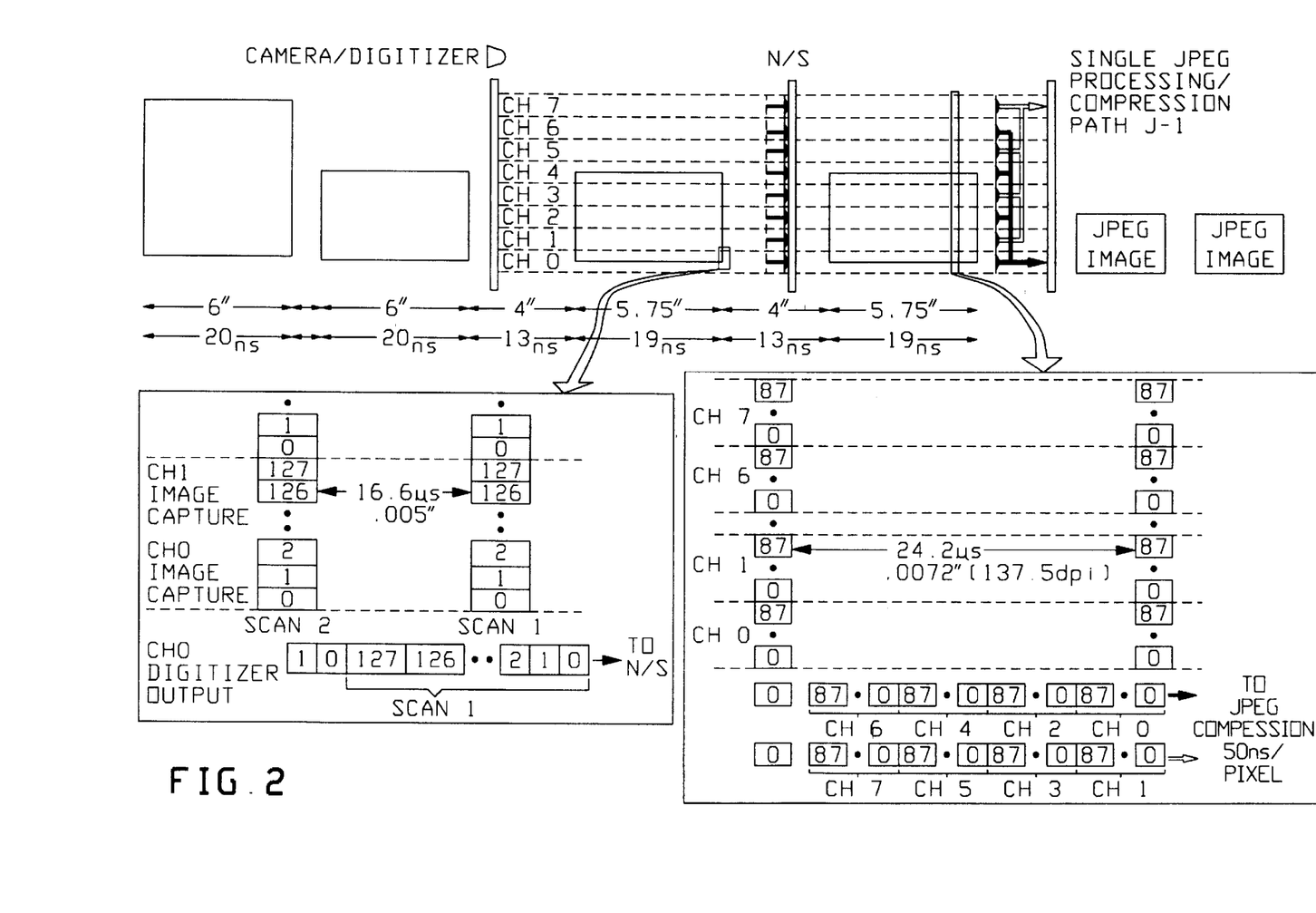

FIG. 2 shows the processing of a sample of check images as they move left to right across the page, simulating the way a check would move through a Check Sorter. (Here, track speed of sorter assumed to be 300 inches per second; this means that a check 6 inches long will take 20 ms to pass a fixed point on the Sorter Track.) Here, checks can range in length from 5.75 inches to 9 inches (19 ms to 30 ms), with inter-checks-gaps ranging from 1.5 inches (5 ms) to several inches.

The check images are captured by a camera means, here preferably comprised of a vertical, 1024-element CCD array which samples 256 grey levels per pixel (8 bits) with a resolution of 200 pixels per inch. In the vertical direction, the Camera can capture images up to 5.12 inches high. The 1024 element array takes a snapshot of the check every 16.66 us as it moves down the Sorter Track, yielding a horizontal capture resolution of 200 pixels per inch. These 1024 pixel scans (captured every 16.66 us by the CCD array) are divided into eight 128 pixel Channels (shown as CH 0 through CH 7 in FIG. 2, each composed of 128 pixel scans). Hardware in the Digitizer D converts each 128 pixel scan into eight serial streams of pixels, with one pixel being output approximately every 130 ns.

The N/S (Normalizer/Scaler) hardware next normalizes the pixel values from the 1024 CCD elements and then scales the image down. The maximum resolution after scaling is 137.5 (11/16ths scaling of 200 dpi captured image) pixels per inch in both dimensions (e.g., see example shown in FIG. 2). In this example the 128 pixel scans in each Channel are reduced to 88 pixels per scan. The N/S hardware "time-multiplexes" four channels' worth of data onto two, 8-bit serial outputs to the JPEG "P/C" hardware. The 88 pixels from all four "even numbered" (total of 352 pixels per scan at 137.5 dpi) Channels (0, 2, 4, 6) are time-multiplexed along one serial stream, while the pixels from the four "odd" Channels (1, 3, 5 and 7) are multiplexed along a second serial stream. The two serial pixel streams operate at 50 ns/pixel (20 MHz) to guarantee that all 352 pixels per scan on each serial path can be transferred to the JPEG "P/C" hardware before the next scan is transferred.

A pair of JPEG "P/C" paths are preferably implemented on an H/C PCB (Histogram/Compressor Printed Circuit Board, as indicated in FIG. 1B). This H/C PCB must detect the image dimensions and perform image processing on the scaled image prior to compression. Selected image processing algorithms require a grey level histogram of the entire image prior to execution. This means the entire image must be buffered (e.g., at 3-1, FIG. 3) and a histogram generated (e.g., at 3-7) before image processing can begin. Once image processing is complete, compression can begin.

The performance of the entire image system is what dictates how the JPEG Processing/Compression hardware must reduce each image to a target packet size; this is why the here-detailed JPEG Compression hardware embodiment executes a 2-pass compression. The first pass uses a "standard" QM (Quantization Matrix) for JPEG compression. The results of the first pass compression, as well as the detected image dimensions, are used to pick a second QM for a second, final compression that will reduce the scaled image to the desired compressed packet size.

To maintain system performance, the JPEG Processing/Compression hardware must perform all these functions in real time which equates to generating a JPEG compression packet in 20 ms for a 6-inch check. Because a single JPEG "P/C" path cannot meet these requirements, multiple paths operating in parallel are required. The described H/C PCB was equipped with two independent JPEG "P/C" paths for this purpose (see FIGS. 3, 1B; preferably, the system has locations for up to 4 H/C PCBs, for Front/Rear imaging, this means the system can have as many as 8 JPEG compression paths operating in parallel; e.g., two for each H/C PCB—on each side). For example, FIG. 4 indicates how two JPEG processing/compression paths are implemented on one H/C PCBA and how up to 4 H/Cs can be used on each side (front and back) of the imaging system.

Figure 3:
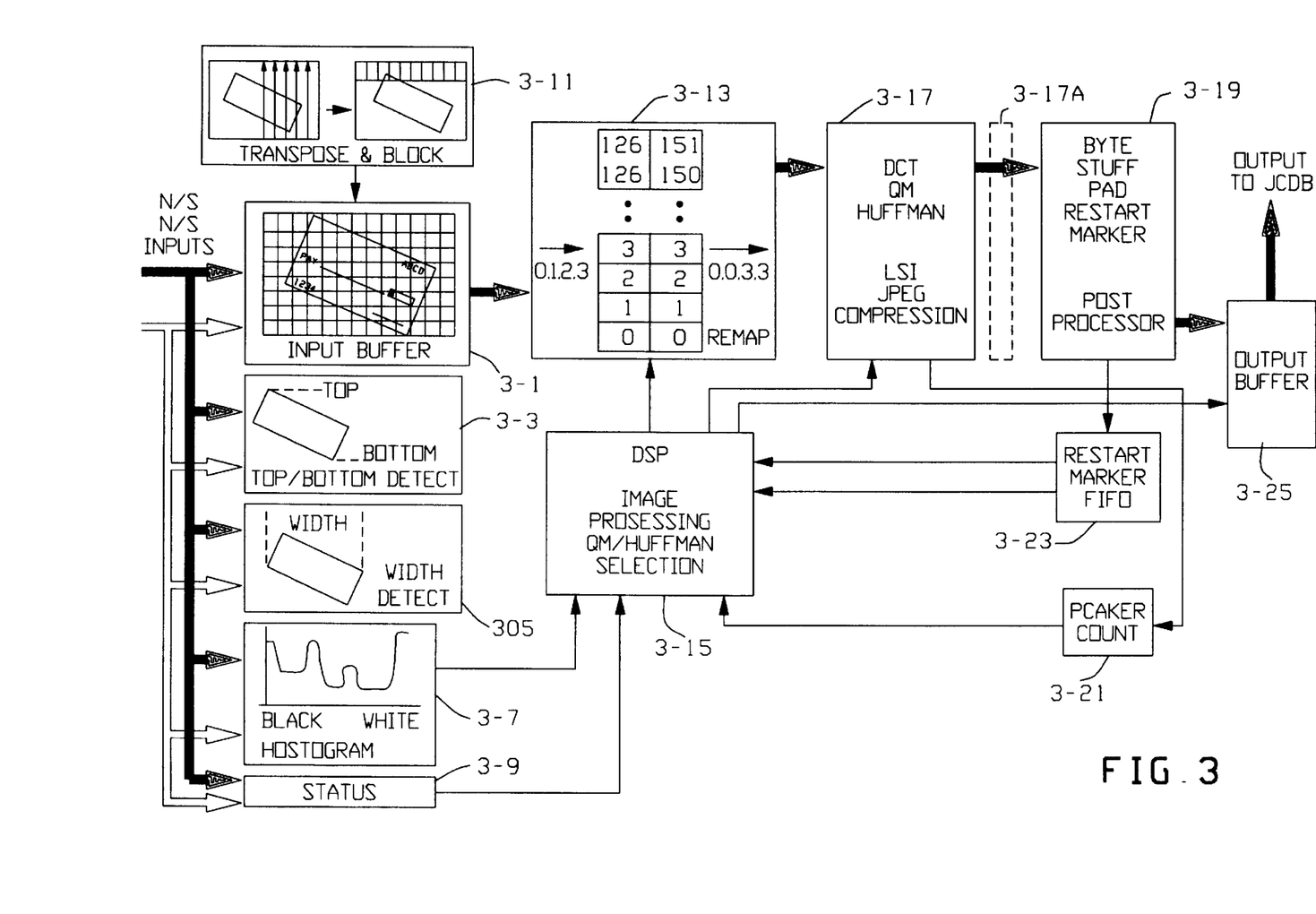
Figure 4:
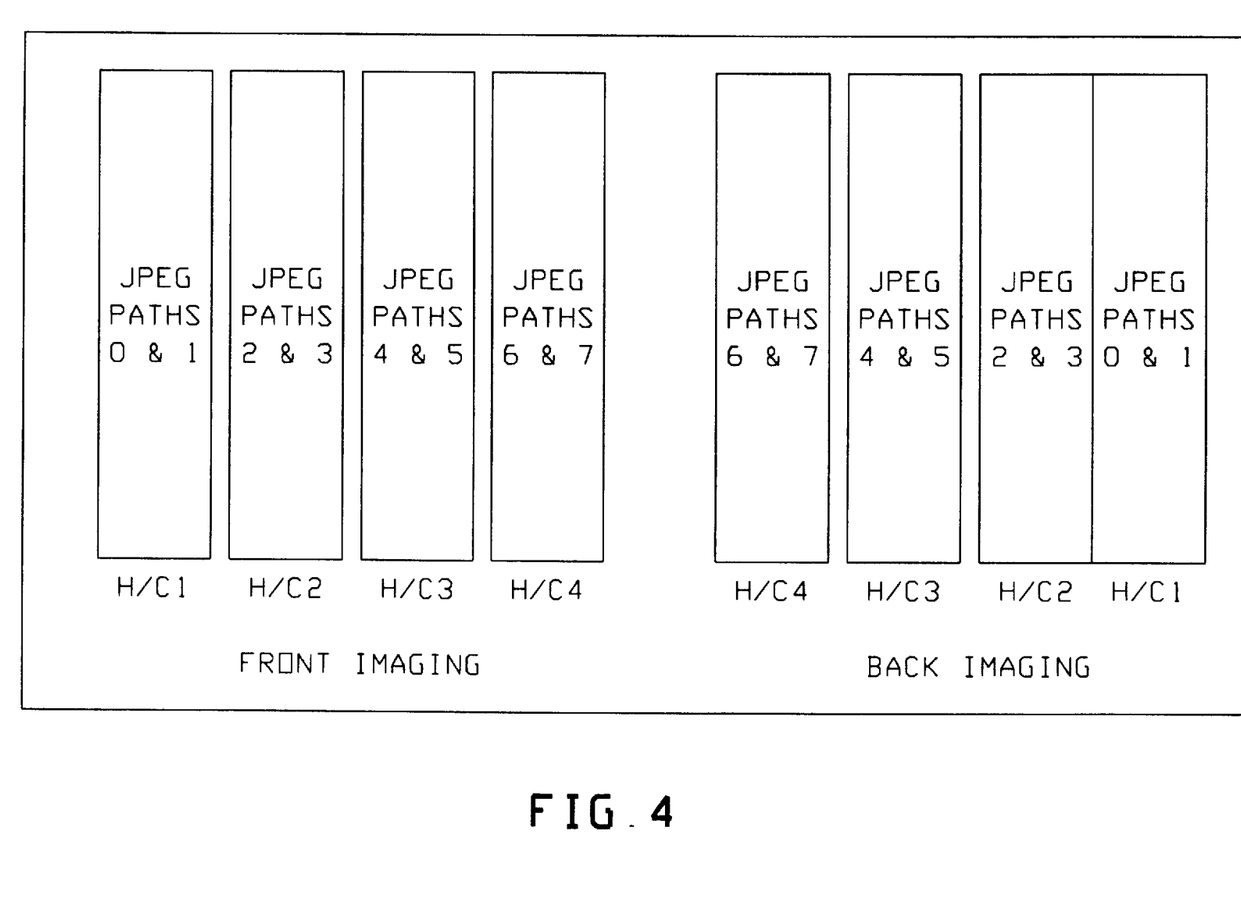
FIG. 4 is a diagram of eight related processing paths.

JPEG Compression Path Functions:

The Block diagram in FIG. 3 indicates the preferred functions performed along a single JPEG processing/compression path on a preferred H/C PCB. Two independent JPEG processing/compression paths are implemented on each H/C PCB. These blocks are described briefly as follows:

a—N/S Inputs:
The JPEG compression path receives "Normalized Scaled" (N/S) image data from the N/S hardware in two serial, 8-bit paths (see two N/S inputs, to 3-1, -3, -5, -7, -9). Each path contains 4 Channels of time-multiplexed, scaled scans; scaled-down to a maximum of 137.5 pixels per inch. The pixels are delivered cross both paths at a rate of 50 ns per pixel (20 MHz). Each pixel is 7 bits representing 128 grey levels with the MSB ("Most Significant Bit") of the 8-bit path set to 0.

b—Input Buffer, 3-1:

The entire scaled image is stored in a 1 Meg×8 Buffer 3-1 as it is delivered from the N/S hardware.

c—Top/Bottom Detect, 3-3:

As the image is being received from the N/S hardware and stored in Input Buffer 3-1, the Top/Bottom Detect Circuitry 3-3 finds the Top and Bottom of the scaled image. The picture shown in FIG. 3 illustrates an exaggerated skew condition that may occur (usually to a much smaller degree) as the sorter moves the check past the CCD camera. The Top/Bottom Circuitry "finds" the extreme Top and Bottom locations.

d—Width Detect, 3-5:

Lead-edge and Trail-edge detection is done by the N/S hardware. The Width Detect hardware (Stage 3-5) counts the number of scaled pixels scans between the extreme Lead and Trail edges as shown in FIG. 3.

e—Histogram, 3-7:

As the image is being received from the N/S hardware and stored in the Input Buffer, a Histogram Circuit 3-7 samples every other pixel (one pixel every 50 ns, switching between both signals paths from the N/S hardware) and sorts the 128 grey level pixels into one of 64 Histogram Bins (LSB, or Least Significant Bit, of 7-bit pixel value is ignored). Once the image is entirely received, the final Histogram will have sorted 50% of the scaled image's pixels, selected in a checkerboard arrangement across the entire image, into the 64 bins that comprise the Histogram 3-7. Pixels above and below the detected Top and Bottom borders of the image are included in the Histogram, but pixels outside the detected Width are excluded. Each bin can record up to 64K occurrences of adjacent grey levels and will "peg" at 64K if that bin overflows.

f—Status Block 3-9:

Status and other image-related information is appended to the Trailing Edge of the scaled image as it is delivered to the JPEG processing/compression path from the N/S hardware. This information is buffered in Status block 3-9 so that it can be retrieved and sent on with the compressed image.

g—Transpose and Block Unit 3-11:

The N/S hardware delivers scaled image data in Vertical scans spanning 8 Channels and starting from either the Top or Bottom of the image (depending on camera orientation), while moving vertically. JPEG compression requires image pixels to be compressed in 8×8, raster-scanned, Pixel Blocks. Pixel Blocks are then scanned in the same method as pixels within a block: horizontally across the Width of the image, and then vertically between the Top and the Bottom. This "Transposition and Blocking" Operation (3-11) can be started at any of the four corners of the image. Pixels outside the Top and Bottom borders of the image, and outside the Width of the image, are not addressed during transposition—thus eliminating useless track background data from the Compressed Image Packet. The output of the Transpose and Block Circuitry 3-11 serves as an address to the 1 Meg×8 Input Buffer 3-1. (See FIG. 6, also.)

h—Remap Unit 3-13:

Image processing is done by changing (Remapping at 3-13) the 7-bit scaled pixels in the Input Buffer 3-1 to 8-bit image-processed pixels as the image is being compressed.

h'—DSP Unit 3-15:

A DSP Unit 3-15 (Digital Signal Processor) determines the Remap Values by reading the 64-bin Histogram (from 3-7) along with inputs from 3-9, 3-5, 3-3), executing the image processing algorithms and loading the 128 resultant "Remap Values" into a "1 to 1" Remap Memory at 3-13.

j—LSI JPEG Compression, 3-17:

A DCT (Discrete Cosine Transform), quantization and Huffman coding for JPEG compression are done in a Chip Set, (3-17, preferably from the LSI Logic Corporation). This Chip Set 3-17 does not need to be "throttled" as it compresses an image, and, therefore, "compression latency" through this Chip Set is deterministic. Scaled, remapped pixels are sent through the LSI Chip Set 3-17 at a 25 MHz rate. The LSI output is a 32-bit word containing JPEG compressed data (but does not have bytes "stuffed" or restart codes inserted, these being inserted at Block 3-19).

k—Packet Counter 3-21:

This Counter records the amount of compressed data emerging from the LSI JPEG Compression Chip Set 3-17. This Count is used by the DSP Unit 3-15 to retrieve the results of first pass compression so a second QM can be selected for the second (final) compression.

l—Post Processor 3-19:

The Post Processor performs the JPEG required byte stuffing and Restart Marker insertion not done by the LSI Chip Set. The Post Processor funnels the 32-bit outputs from the LSI Chip Set down to a 16-bit wide Output Buffer 3-25, inserting stuffed bytes and restart codes when necessary.

To ease the location of entropy-coded segments (compressed data between Restart Markers) in the final Compressed Image Packet, restart codes are inserted on 32-bit boundaries by the Post Processor Unit 3-19 (codes recorded in 3-23). Therefore, the Post Processor must insert padding bytes, when required, to align restart codes on double-word boundaries.

m—Restart Marker Table (FIFO) 3-23:

A table of addresses pointing to the location of Restart Markers in the Compressed Image Packet are stored in the Restart Marker FIFO 3-23 and can be used by the DSP 3-15 to truncate images on entropy coded segment boundaries.

n—Output Buffer 3-25:

The JPEG processing/compression path assembles the Compressed Image Packet in a 64K×16 Output Buffer 3-25. Once a Compressed Image Packet is completely assembled, it can be burst-transferred to the JCDB next component (JPEG Compressed Data Buffer) in the imaging system.

In sum, the DSP 3-15 performs the following functions:

i—After an image is input from the N/S, the DSP 3-15 reads the 64-bin Histogram, executes the image processing algorithms and loads the resultant Remap Table into the Remap RAM (at 3-13);

ii—Prior to first pass compression, the DSP loads the default QM and Huffman tables into the LSI JPEG Compression hardware;

iii—After first pass compression, the DSP retrieves the results (of first pass compression) from the Packet Count Register 3-21, and the image dimensions from the Top/Bottom and Width Detectors, then selects a new (second) QM and Huffman table to achieve the proper compression results for a second compression, and loads this chosen QM and Huffman table into the LSI Chip Set;

iv—After second pass compression is complete, the DSP inserts all pertinent header information into the Compressed Image Packet in Output Buffer 3-25.

JPEG Processing/Compression Functions Implemented in Hardware:

In the previous section, all the functions of the JPEG processing/compression path were introduced. In this section, the hardware-intensive functions are described in detail. The DSP functions, although critical to operation of the JPEG processing/compression path, are software based and not discussed in this section. The hardware functions next detailed are as follows:

Histogram
Top/Bottom Detection
Width Detection
Status Capture
Transpose and Block-Input Buffer
Remap
LSI JPEG Compression
JPEG Post Processor
Restart Marker FIFO
Packet Count
Output Buffer The DSP, via software, executes the "grey level stretch and contrast reduction" algorithms by reading the 64 bin histogram of an image and generating a 128-entry remap table to be used by the Remap hardware. Also, the DSP chooses and loads the LSI chips set with the QMs and Huffman tables needed for first and second pass compression. Lastly, the DSP builds the necessary header data, (surrounding the compressed image data), and loads this header data into the Output Buffer 3-25.

Histogram:

The Histogram is generated in unit 3-7 as the image is being delivered from the N/S hardware and stored in the Input Buffer 3-1. The Histogram could have been generated without any custom hardware by having the DSP unit scan the contents of the Input Buffer after the image has been loaded. This, however, would greatly increase the time required for the JPEG processing/compression path to process the image because:

1—Not only would it take relatively long (compared to custom hardware) for the DSP to subsample the contents of the Input Buffer, but 2—this sampling could not be done until AFTER the image was stored in the Input Buffer.

Thus, by generating a Histogram with custom hardware WHILE the image is being input, the Histogram is available to the DSP as soon as the image has been input.

The only apparent drawback to so generating the Histogram during input of the image is that the Histogram is being generated BEFORE the Top and Bottom boundaries of the check image have been determined (lead and trail edges of image are predetermined by N/S hardware). This means that pixels representing track background, above the top and below the bottom borders of the check image, are included in the Histogram. This will cause the "darkest" bins of the Histogram to be fuller than if the boundaries were known prior to generating a Histogram. This apparent drawback, in reality, is inconsequential, since the image processing algorithms, selected performed by the DSP according hereto, are not significantly affected by the quantity of pixels in the "darkest" bins.

The Histogram circuitry samples 50% of the pixels in the image by sampling pixels every 50 ns (20 MHz input from N/S) from one of the two serial N/S inputs (Channels 0, 2, 4, and 6) and then from the other (Channels 1, 3, 5, and 7). The net effect is that the pixels sampled are arranged in a checkerboard pattern across the image. As a pixel is sampled, the "upper 6 bits" of the 7-bit pixel (LSB is ignored) are used to address a 64-bin Histogram RAM. The contents of the RAM at the addressed location are extracted, incremented by 1 and reloaded into the RAM. These iterations of reading, incrementing and writing must be done every 50 ns. Although a 20 MHz synchronous clock is used to begin every iteration, the reading, incrementing and writing are performed with asynchronous, pipelined logic using 2 CPLDs (Complex Programmable Logic Device) and 2 SRAMs (Static Random Access Memory).

Each of the 64 bins is 16-bits wide and can therefore record 64K occurrences of adjacent grey levels (e.g., 100 0101 and 100 0100 are sorted into bin 33). If, during the "Read-Increment-Write" iterations, any of the bins become full (reach a count of 0xFFFF), this bin will NOT overflow with any additional pixels (reset to 0x0000) because the bin will peg at 0xFFFF. This is essential for the image processing algorithms to get a good approximation of the grey level content and distribution in the image.

Transpose and Block Input Buffer:

The Input Buffer 3-1 is used to store the contents of the scaled, normalized image so that it can be transposed, grouped into 8×8 pixel blocks and sent to the compression hardware. Not only is it necessary to store the entire image for transposition purposes, but it is essential, to achieve predictable compression results, to perform "two-pass compression" on a fixed input image.

The Transpose and Block function (see 3-11) is used to generate the 20-bit address needed to access the 1 Meg×8 Input Buffer. It is this function that first stores the image data into the Input Buffer 3-1 as it is delivered from the N/S, and then removes the data in transposed, 8×8 blocks during each of the two compression passes.

Figure 5:
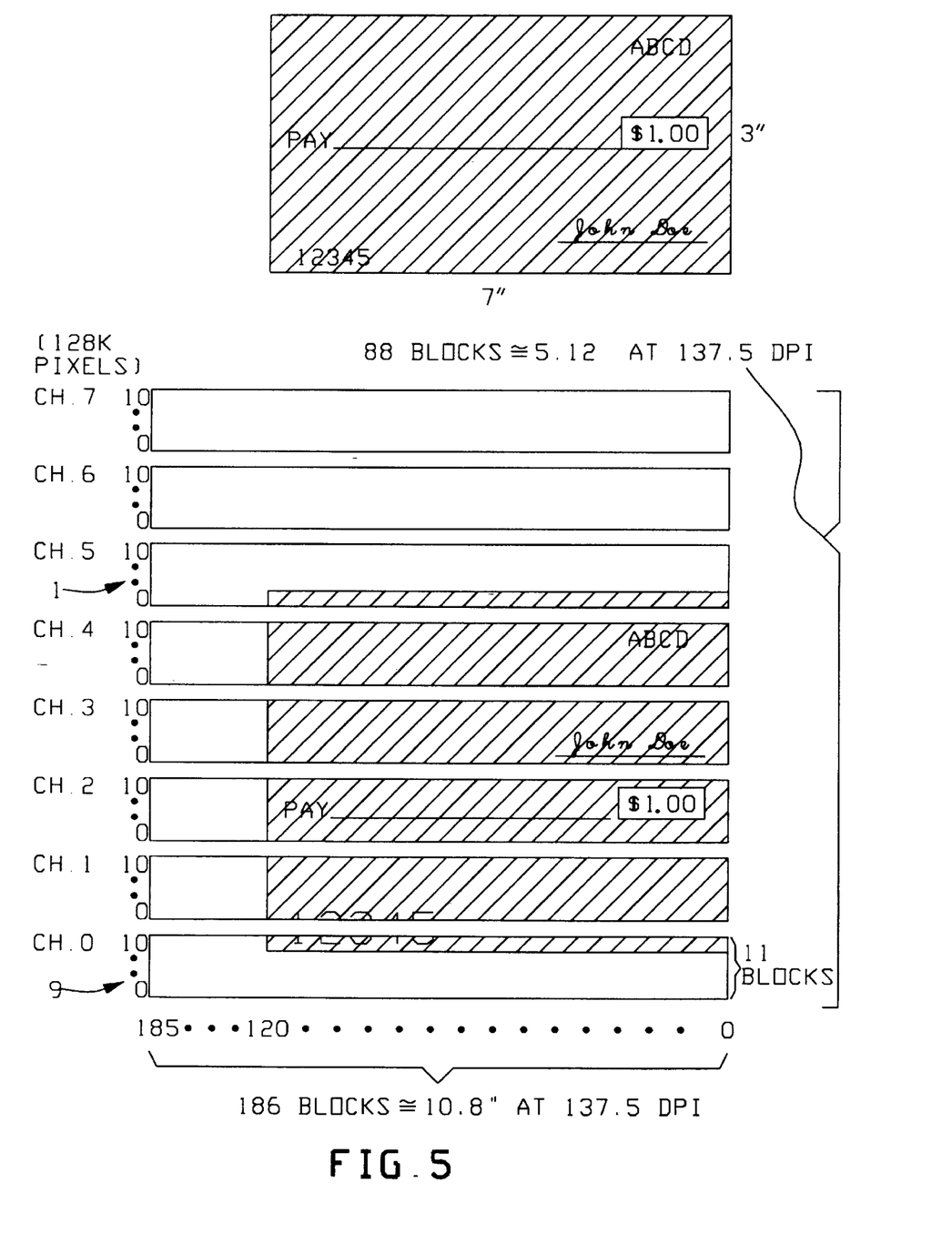
FIG. 5 is an item-related diagram of a subdivided Input Buffer for the array in FIG. 3, while FIG. 6 indicate how the item in FIG. 5 is preferably addressed and processed.
Figure 6:
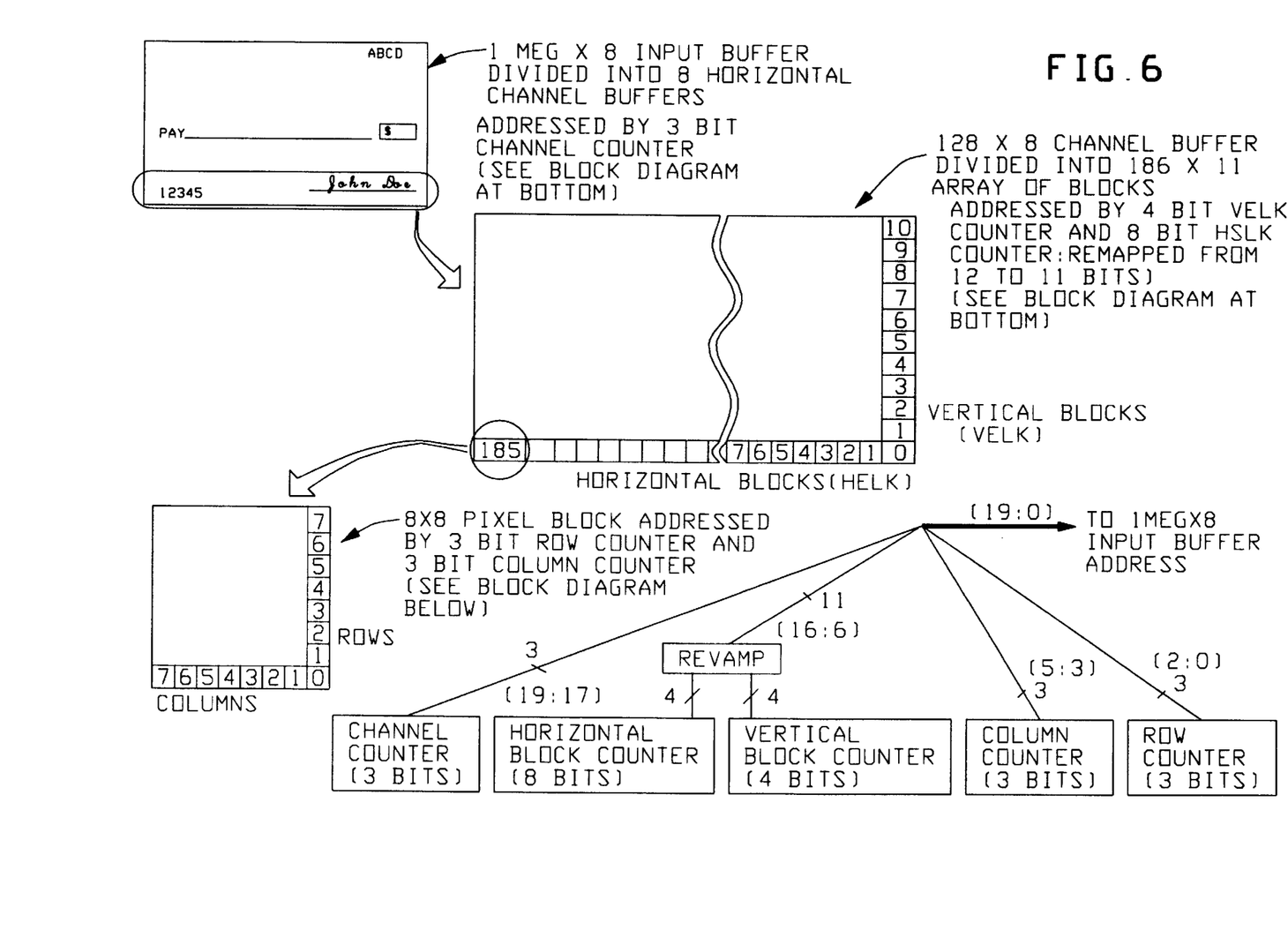

To understand how this is done, it is important to know how the 1 Meg×8 Input Buffer 3-1 is spatially divided. This arrangement is shown in FIGS. 5, 6. Since the Input Buffer is byte-wide, each byte will hold one 7-bit pixel (MSB is 0). The 1 Meg×8 buffer is first divided into eight, horizontal, 128K×8 Channel Buffers representing the 8 channels of image data from the N/S (e.g., see FIGS. 5, 6). The 3 MSBs of the 20 address lines access one of the 8 channels.

Each 128K×8 Channel Buffer is divided into an 186×11 array (FIG. 6) of 64-pixel blocks. The reason for this arrangement will be explained later. Eleven of the 20 address bits are used to select the block within the Channel Buffer. Finally, each block is divided into an 8×8 array of pixels with the 6 LSBs of the 20 address bits used to select the pixel within a block (FIG. 6).

The Channel Buffers are arranged in an array of blocks composed of 11 horizontal rows by 186 vertical columns. Because the maximum scaling resolution acceptable by the JPEG processing/compression hardware is 137.5 dpi (11/16ths scaling of 200 dpi captured image), the maximum number of pixels processed, per vertical scan in one channel, is 88. Since there are 8 rows of pixels per block, 11 blocks are needed to cover the vertical dimension. One vertical column of 11 blocks consumes 704 (11×64) memory locations. Since there are 131072 (128K) locations in each Channel Buffer, up to 186 (131072/704=186.18) columns of 11 blocks can fit inside the memory. At 137.5 dpi (11/16ths scaling), this translates into a horizontal measure of 10.8 inches . . . more than enough to store the maximum check width of 9 inches. It is rare that some of the columns on the "far left" (see FIG. 5) of the Channel Buffer would ever be used, since the average check length would be between 6 and 7 inches. Likewise, if scale factors less than 137.5 dpi (11/16ths scaling) are used, the block rows near the top of the Channel Buffer will not be used. For example, at 100 dpi (8/16ths scaling), the top three rows of the Channel Buffer will not be used.

To access the Input Buffer, (3-1, FIG. 3), the hardware implements five counters listed below (and shown in FIG. 6):

| Channel Counter | 3 bits | Accesses the 8 horizontal Channel Buffers that comprise the Input Buffer |
|---|---|---|
| Vertical Block Counter | 4 bits | Accesses the 11 rows of blocks in each Channel Buffer |
| Vertical Block Counter | 8 bits | Accesses the 186 columns of blocks in each Channel Buffer |
| Column Counter | 3 bits | Accesses the 8 columns of pixels in each 8×8 block |
| Row Counter | 3 bits | Accesses the 8 horizontal rows of pixels in each 8×8 block |

Because the Vertical Block Counter and Horizontal Block Counter are not fully utilized (11 of 16 and 186 of 256 respectively), their combined values are remapped, via a "PROM look up table", to form a Block pointer value consisting of 11 bits. In total, therefore, 20 bits are needed to access the entire Input Buffer 3-1 (FIGS. 3, 6).

By controlling the five counters described above (FIG. 6) and changing their operating parameters (when they are incremented, when they are reset or preset and whether they count up or down), the hardware is able to store a vertically scanned image in the Input Buffer 3-1 and then unload, in 8×8 blocks, starting from either of the four corners of the image.

The following describes detailed control of the five counters during image capture and image compression.

Counter control during image capture:

During image capture, the N/S hardware delivers vertical scans of pixel data in two serial pixel streams as shown in FIG. 2.

To store ONE vertical scan, the JPEG processing/compression hardware must store these pixel pairs at two separate locations in its 1 Meg×8 Input Buffer (FIG. 5) simultaneously. For this reason, the least significant bit of the Channel Counter is not used during image capture because pixels are received in pairs (from channel 0/1, 2/3, 4/5 and 6/7 respectively) and must be stored in two separate channels of the Input Buffer simultaneously. As valid pixel pairs are delivered from the N/S hardware, the Row Counter (FIG. 6) is incremented. When the Row Counter rolls over (every 8 pixels), the Vertical Block Counter is incremented. When the Vertical Block Counter reaches the scale factor (e.g., when the Vertical Block Counter reaches 11 for 11/16ths scaling), the Vertical Block Counter is reset and the Channel Counter is incremented by 2. When the Channel Counter rolls over from 6 to 0, the Column Counter is incremented. In this fashion one vertical scan is stored in the Input Buffer (3-1).

Every 8 scans, the Column Counter will roll over and the Horizontal Block Counter is incremented. Once the image is completely input, the Horizontal Block Counter will indicate the width of the scaled image in units of 8 pixel blocks.

Counter Control During Compression:

To understand the control of the counters during compression, use FIG. 5 for reference. In this figure, an image has been stored in the Input Buffer during image capture. The valid portion of the image lies between Horizontal Block (HBLK) #0 and HBLK #120 (as determined by the width count) and between channel 5, Vertical Block (VBLK) #1 and channel 0, VBLK #9. In this example, compression will begin at top left corner of the image and will proceed left to right, top to bottom. Compression direction can begin in any of the 4 corners of the captured image and counter control will be slightly different for each compression orientation.

To start, the Channel Counter is preset to 5, the VBLK counter is preset to 1, the HBLK counter is preset to 120, the Column Counter is preset to 7 and the Row Counter is preset to 7 (upper left-hand corner of image). For JPEG compression, pixels must be raster scanned one pixel at a time, one block (64 pixels in 8×8 array) at a time. If the image is being compressed left to right, top to bottom (as it is in this example), all 64 pixels within the block must be read in the same direction before another block is read. Therefore, to read one 8×8 block, the Column Counter is continuously decremented (from 7 to 0) and every time the Column Counter rolls over (7 to 0) the Row Counter is decremented. Once the entire block has been read (64 pixels), the HBLK counter is decremented (moving left to right) and 64 pixels are read from the next block. After all 120 blocks are read in a row (HBLK counter reaches 0), the VBLK counter is decremented (moving top to bottom), and the HBLK counter is preset to the image width (left side or 120 in this example). Once the VBLK, HBLK, Column and Row counters reach 0 (bottom right corner of a channel), the Channel Counter is decremented, the VBLK counter is preset with one less than the scale factor (top of the channel or 10 in the case of 11/16ths scaling), the HBLK counter is preset to the width (left or 120 in this example) and the Column and Row counters are preset to 7 (top right corner of a block). Counter control proceeds until the pixel at the bottom right corner of the image is read (in this example CH=0, VBLK=9, HBLK–0, Column=0, Row=0); then compression terminates.

Top/Bottom Detection (e.g., see 3-3, FIGS. 3,7):

The top and bottom borders of an image are detected as the image is being delivered from the N/S hardware and stored in the Input Buffer 3-1.

The borders could have been found without any custom hardware by having the DSP scan the contents of the Input Buffer after the image has been loaded. This, however, would greatly increase the time required for the JPEG processing/compression path to process the image (e.g., not only would it take relatively long for the DSP to sample the contents of the Input Buffer, but this sampling could not be done till AFTER the image was stored in the Input Buffer). By finding the borders with custom hardware WHILE the image is being input, the borders are available to the DSP as soon as the image has been input-thus saving time.

The top and bottom borders detected by the hardware are relative to the scan direction of data received from the N/S hardware. In other words, scans are assumed to be "pixel-wide" vertical strips spanning all 8 channels starting at the bottom block of channel 0 and proceeding to the top block of channel 7. The bottom border of the image is the lowest occurrence of image data relative to the scan direction. This may actually be the top of the physical image, depending on which camera is capturing the image (front or back) and how the check was loaded in the track (e.g. upside down?)

The resolution of the border detection circuitry is in units of blocks, not pixels. Therefore, borders are reported according to the channel and block row within the channel. A typical example of bottom and top borders detected by the hardware are BOTTOM=channel 0, row 6; TOP=channel 6, row 3.

Borders are determined on a "scan-by-scan" basis. Initially, prior to receiving the first vertical scan of an image, the top border is set at the extreme BOTTOM (CH 0, block 0) and the bottom is set at the extreme top (CH 7, block A). As the first scan is delivered from the N/S, the JPEG compression path hardware compares each pixel to a given "border" threshold value. Pixels "whiter" than the threshold are considered part of the check image, while pixels "darker" than the threshold are considered track background. Every time 5 consecutive image pixels are seen, the hardware declares a "transition". The first transition seen in a scan is considered the "bottom" of that scan while the last transition in a scan is considered to be the "top". After each scan, the top and bottom borders of the latest scan are sent to a Top and Bottom Port. Only if the latest scan's top border is "higher" than the value presently existing in the Top port will the Top port be updated to the new value. Likewise, only if the latest scan's bottom border is "lower" than the value presently existing in the Bottom port will the Bottom port be updated. The net result is that, after the entire image has been input, the Top port will contain the channel and block number of the "highest" point of the image and the Bottom port will contain the channel and block number of the "lowest" point of the image.

The reason the hardware requires five (5) CONSECUTIVE image pixels before declaring a transition is to prevent the top/bottom circuitry from erroneously declaring a border based on dust or scrap (noise) in the track that might exceed the value of the selected threshold for a few consecutive pixels. Selection of five has been determined experimentally.

Figure 7:
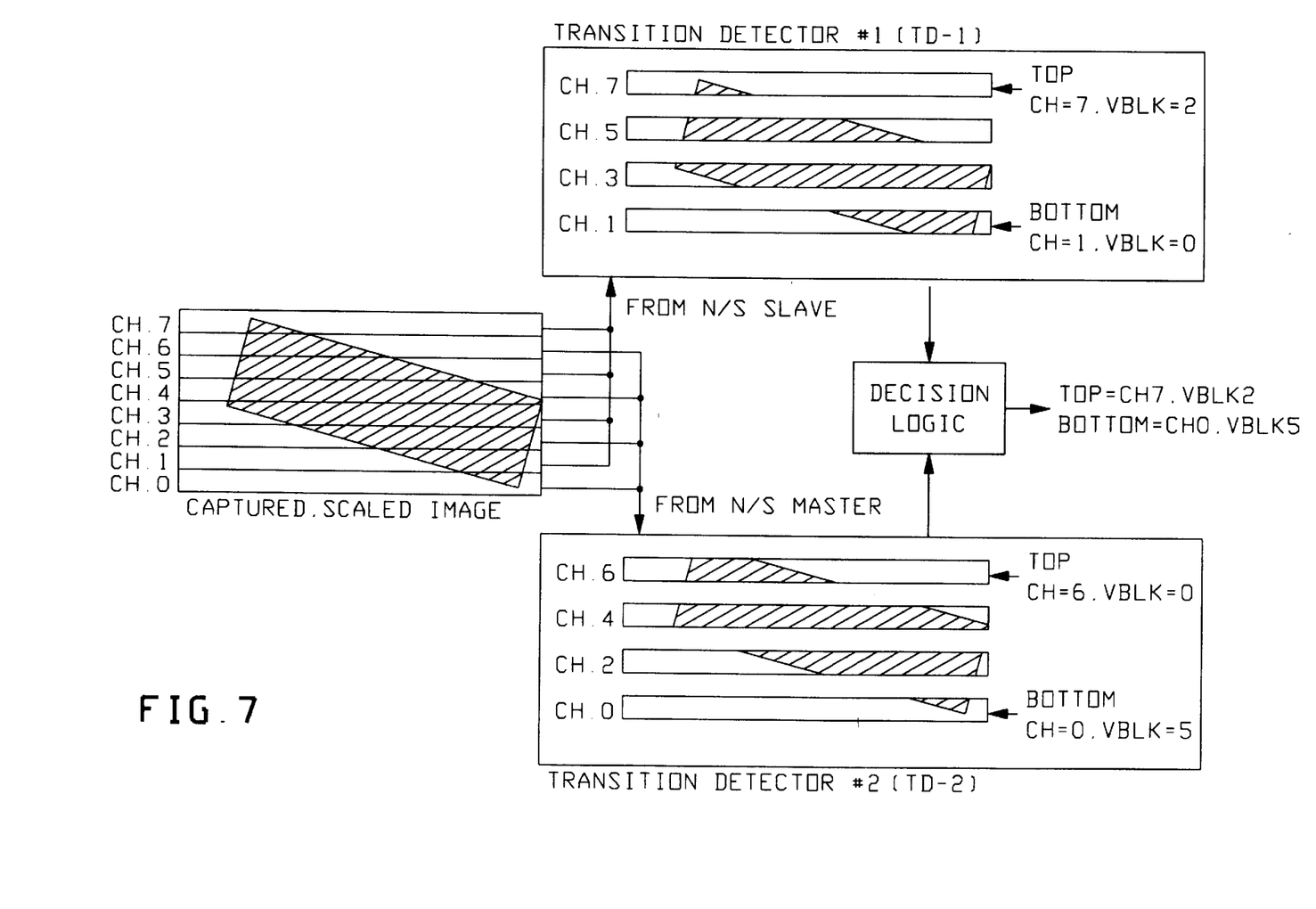
FIG. 7 similarly illustrates how the top/bottom of the item are detected for such processing in two four-channel streams.

Although, this concept of border detection may seem straight-forward, it is complicated by the fact that the vertical scans are not delivered to the H/C by a single pixel stream sequentially from the bottom to the top of the scan. Rather, data is delivered simultaneously from two pixel streams representing data from odd/even channels (0, 2, 4 and 6 and channels 1, 3, 5 and 7), respectively. To find a border of a single scan based on two interleaved streams of pixels, the hardware implements two independent transition detectors TD-1, TD-2 (one for each N/S pixel stream; see FIG. 7; FIG. 7 illustrates top/bottom detection from two serial pixel streams). When transitions are detected, the hardware considers which of the two detectors found the transition, the value of the Channel Counter and the value of the Vertical Block Counter (see the Transpose and Block description) to see where, in the scan, the transition took place. Based on this information, the appropriate Top or Bottom port can be updated.

Width Detection:

The top and bottom borders are detected by the JPEG processing/compression path hardware, but the right (leading) edge and left (trailing) edge are detected upstream by the N/S hardware. The N/S hardware, subsequently, only "qualifies" the data between the lead and trail edges when it delivers pixel data to the JPEG processing/compression (P/C) paths. The N/S hardware will only qualify data in groups of 8 vertical scans. In other words, the N/S hardware frames the image in the horizontal dimension on block boundaries. Therefore, the only action the JPEG processing/compression hardware need perform to detect the width of the image (in block units) is to count every eighth qualified scan from the N/S unit. By doing this, the JPEG processing/compression hardware is able to furnish the horizontal dimension of the image to the DSP as soon as the image is input from the N/S.

Status Capture:

When the N/S hardware sends image data to the JPEG P/C path, it appends a burst of image-related "status" information on the "back porch" of the image transfer. The JPEG P/C path must take this information, supplement it with "status data" pertinent to the P/C hardware and attach it to the now Compressed Image Packet that is to be sent to the rest of the check imaging system via the JCDB (output of FIG. 3).

The JPEG P/C hardware accomplishes this function by buffering the "status data" as it is received from the N/S (buffered at 3-9 FIG. 3), and then making this data available to the DSP for inclusion in the final Compressed Image Packet.

Remap (See 3 13, FIG. 3):

The normalized and scaled image received from the N/S unit, and stored in Input Buffer 3-15 (FIG. 3), is processed prior to compression. As stated earlier, the image processing algorithms are executed by the DSP, based on the image dimensions and histogram generated by the hardware as the image was being input from the N/S. Once the algorithms are executed, the image could be updated by having the DSP update every pixel in the Input Buffer to its new image processed value. Such a method would take a relatively long time, since the DSP would have to fetch, update and write every pixel in the Input Buffer.

A much faster method is preferred: i.e., to remap pixels "on the fly" as they are sequentially sent to the compression hardware. To implement this method, the DSP generates a 128-entry "remap table" (one for every pixel grey level). During compression, every pixel (7 bits) pulled from the Input Buffer addresses the 128 entry table (implemented in high speed RAM at 3-13) and the output from the table is the remapped, image processed value (8 bits) for that pixel. This "remapped pixel" (value) is then sent to the compression hardware (i.e., to 3-17, and beyond).

LSI JPEG Compression (see 3-17, FIG. 3):

The JPEG defined Discrete Cosine Transform (DCT), quantization and Huffman coding is implemented in a two-chip set from LSI LOGIC CORPORATION. This chip set requires that image pixels be delivered in 8×8 blocks. The retrieval of image data from Input Buffer 3-1 in the proper (8×8) sequence is effected by the Transpose and Block logic 3-11. The pixels are remapped (image processed) "on the fly" (at unit 3-13) before being sent to the LSI chip set (i.e. to block 3-17).

Because of the performance requirements of the high speed check imaging system, it is important to be able to compress the video image in Input Buffer 3-1 to a known packet size in a determinate amount of time. The image will be compressed once with the LSI chip set, using a standard QM and Huffman table provided by the DSP. Then, the result of this first compression, along with the image dimensions, will be used by the DSP to select a second QM and Huffman table which is then sent to the LSI chip set by the DSP. With this second QM and Huffman Table, this image (bit set) is then compressed a second time, then passed through Post Process unit 3-19 and stored in Output Buffer 3-25. This "dual compression" technique is a feature hereof, and will be understood to yield the desired compression packet size.

The design of the chip set by LSI LOGIC Corp. is such that the time required to compress an image can be determined by the amount of pixels to be compressed, as well as by the speed at which compression is executed. Even in the (statistically rare) case where JPEG compression results in EXPANSION, the LSI JPEG chip set will take no longer to execute. This feature is critical to performance in a high speed check imaging system like the indicated DP1800. To further increase compression speed and reduce the time a JPEG compression path requires to process an image, the operating clock frequency of the JPEG compression path is preferably increased from 20 MHz to 25 MHz during compression.

Packet Count (see 3-21, FIG. 3):

The JPEG P/C hardware need not save the results of "first pass compression". Therefore, many of the functions executed by Post Processor Unit 3-19 (e.g., byte stuffing, restart code insertion, writing to Output Buffer) are not done during "first pass compression". What is needed from first pass compression is merely an estimate of the result it yields. To provide this, the (32-bit) words output from the LSI LOGIC chip set 3-17 during compression are counted by the Packet Counter 3-21. The only inaccuracy in this count is that it does not include any "extra data" like stuffed bytes, restart codes or padded bytes that would be added to the compressed image by the Post Processor 3-19 (see FIG. 3). This extra data, however, is relatively insignificant, even for the most compressible images.

After "first pass compression", the DSP reads the Packet Counter and uses this "word-count" information to pick a Huffman Table and a QM for the "second compression."

JPEG Post Processor (See 3-19 and 3-17A FIG. 3):

The LSI JPEG chip set outputs 32-bit words of "entropy coded data" during compression. This data does not include the JPEG required "stuffed bytes" (a byte of 0x00 must follow every byte of 0xFF entropy coded data), or the JPEG required "restart codes" (two bytes of 0xFF and 0xDy after each horizontal row of blocks has been compressed) or the "padding bytes" (0xFF) required by the application to align restart codes on 32-bit boundaries.

The JPEG compression hardware must take the 32-bit output from the LSI chip set, insert the necessary data described above and funnel this information down into the 16-bit-wide Output Buffer 3-25. To accomplish this, the JPEG Post Processor 3-19, must take one byte at a time from the 32-bit LSI chip set output, check to see if the byte equals 0xFF, send this data to the Output Buffer—and also send another byte of 0x00 if the previous byte was 0xFF. After compressing each horizontal row of blocks, the Post Processor will insert the two-byte restart marker and the number of padding bytes required to align restart markers on 32-bit boundaries. JPEG standards require the restart marker to have a MOD 8 count component; and this is provided by the Post Processor hardware.

On average, it takes one clock cycle for the Post Processor to process each byte of data from the 32-bit (4 byte) LSI chip set . . . two clock cycles if a 0x00 byte needs to be stuffed. While compressing "busy" portions of the image, it is possible (worst case) for the LSI chip set to output a 32-bit word 3 times for every four clocks. The Post Processor cannot keep pace with the LSI chip set during these "busy" portions of the image. To mitigate such "special circumstances", the JPEG compression hardware preferably also provides a 1K×32 FIFO buffer 3-17A between the LSI chip set output and the Post Processor Logic (i.e., between 3-17 and 3-19). This buffer 3-17A allows the LSI output data to be buffered, and not lost, while the Post Processor catches up during "un-busy" portions of the image. Since the Post Processor only operates during "second pass compression" (when the DSP has already selected a target QM, and when compression is more predictable), the probability of "busy" portions of image occurring is greatly reduced. Therefore, any FIFO buffer, let alone a 1K FIFO, would rarely be used. In the statistically-rare case where the FIFO (3-17A) is being heavily used, the input to the LSI chip set will be throttled by the JPEG compression hardware when the FIFO (3-17A) reaches "half-full" (512 words waiting for Post processing). Although this feature will rarely be used, it prevents data from being lost, even in the most extreme case. In fact, images would have to EXPAND by a factor of 4 before this feature would ever kick-in. The only side effect of executing this feature is a slight increase in compression time due to the occasional "throttling" of the input to the LSI chip set (in 3-17).

Restart Marker FIFO (3-23, FIG. 3):

During "second pass compression", the JPEG P/C hardware generates and loads the compressed (entropy-coded) data into Output Buffer 3-25. After second pass compression is complete, the DSP builds the required header information around the entropy coded data packet. One of the required elements of the header is a table of offsets that will point to the END of each entropy coded segment in the Output Buffer. An entropy coded segment from the JPEG P/C hardware is comprised of the compressed data from one horizontal row of 8×8 blocks, ending with a restart marker. Providing this table allows the compressed image to be "gracefully" truncated by software on entropy coded segment boundaries.

The DSP gets this "offset" information from the Restart Marker FIFO 3-23. During second pass compression, the Post Processor 3-19 must insert restart markers into the Output Buffer at the end of each entropy coded segment. When the Post Processor loads a restart marker into the Output Buffer, the address into the Output Buffer at that particular instant is loaded into the Restart Marker FIFO.

Output Buffer (3-25, FIG. 3):

The 64K×16 Output Buffer 3-25 is the physical location where the Compressed Image Packet is built by the JPEG compression hardware (entropy coded data) and by the DSP (header information). During second pass compression the entropy coded data is loaded into the Output Buffer. After second pass compression is complete, the DSP builds the remaining header information around the entropy coded data. Once this is complete, the Image Packet is ready for transfer to the next stage (see JCDB, or "JPEG compressed Data Buffer", FIG. 3) of the high speed check imaging system; and then the JPEG compression path is free to accept another image into its Input Buffer 31.

This "dual buffering" (Input Buffer and Output Buffer) so implemented in my JPEG processing/compression path according to this feature, increases performance by allowing a second image to be received by a JPEG compression path before the first Compressed Image Packet is sent to the JCDB.

REPRISE

In summary, it will be understood that this invention provides, among other features, a digital data processing/compression arrangement, especially for video (image) data bits representing a document—presented in serial stream—especially using a pre-processing buffer stage for presenting the data in two parallel bit-streams, with two parallel like compression paths, especially where "two-stage" compression is used, doing so in "real time" and, preferably to JPEG standards—more especially using a single two-pass PC board.

While the above describes how to make and use certain invention embodiments, various alternative constructions and techniques may be employed without departing from the true spirit and scope of the invention as here claimed.

Workers will appreciate how aptly such a dual, two-path, two-stage compression arrangement is more effective for real-time processing.

It will be understood that the preferred embodiments described herein are only exemplary, and that the invention is capable of many modifications and variations in construction, arrangement and use without departing from the spirit of this invention.

Further modifications of the invention are also possible. For example, the means and methods disclosed herein are also applicable for compressing other serial bit-sets.

The above examples of possible variations of the present invention are merely illustrative. While variations in these various embodiments may not, each, yield all the mentioned advantages, certain features may loom more important than others depending on the application. Accordingly, this invention is to be considered as including all possible modifications and variations coming within the scope of the appended claims, and to be limited only by these claims.

What is claimed is:

1. In a system for processing a stream of digital bit sets, each related to a different subject in a passing array, said system including an arrangement for compressing said bit-sets in said stream and sending the results to utilization means, said arrangement also comprising:

a preprocessing stage for distributing each said bit set in two parallel bit-compression paths, with all input sent to a common output buffer means, each said compression path being adapted to execute a prescribed first compression to ascertain "initial factors", and then execute a prescribed second compression to use a said initial factor with the second compression values being selected according to "word count" factors derived from results of the first compression; and provide a prescribed time-compressed output to said utilization means as "entropy encoded data";

wherein said both said compressions are performed in real time, according to JPEG standards and using prescribed selected QM and Huffman table values, on a single two-pass stage of a Histogram/Compressor printed circuit board;

wherein compression-control means is also provided to add "peripheral data", including "stuffed bytes", "restart codes" and "padding bytes" to each said compressed output; and wherein post processor means is also provided to accept said compressed data as 32-bit output and funnel it down to 16-bit output presented to said utilization means.

2. The invention of claim 1, wherein at least some of said "peripheral data" is added at said post processor means.

3. The invention of claim 2, wherein upon transfer of said "peripheral data" said compression stage is ready for the next stream of data bits.

4. The invention of claim 1, wherein said preprocess-stage includes normalizer/scaler means feeding two parallel bit streams to said compression stage.

5. The invention of claim 4, wherein said compression stage comprises part of a prescribed histogram/compression H/C stage on printed circuit board means.

6. The invention of claim 5, wherein said H/C stage comprises input buffer means feeding JPEG compression means, detect means for determining the width, and the top/bottom location of each given bit set image.

7. The invention of claim 6, wherein control means DSP is provided to communicate with said detect means and said JPEG compression means and said output buffer means.

8. The invention of claim 7, wherein transpose/block means is also provided to convert each bit set.

9. The invention of claim 7, wherein status indicator means is also provided.

10. The invention of claim 7, wherein remap means is also provided.

11. The invention of claim 7, wherein restart marker means is also provided.

12. The invention of claim 7, wherein packet count means is also provided.

13. A system for processing a stream of digital bit sets, each related to a different subject in a passing array, said system including an arrangement for compressing said bit-sets in said stream and sending the results to utilization means, said arrangement also comprising:

a preprocessing stage for distributing each said bit set in N parallel bit-compression paths, with all input sent to a common input buffer means feeding said paths, each said compression path being adapted to execute a prescribed first compression to ascertain "initial factors", and then a prescribed second compression to use said initial factor, with the second compression values selected according to "word count" factors derived from results of the first compression, and provide a prescribed time-compressed output to said utilization means;

wherein said both said compressions are performed according to JPEG standards; and second compressions are performed using prescribed selected QM and Huffman table values, and wherein post processor means is provided to accept said compressed data as 32-bit output and funnel it down to 16-bit output presented to said utilization means.

14. The invention of claim 13, wherein compression-control means is provided to add "peripheral data", including "stuffed bytes", "restart codes" and "padding bytes" to each said compressed output.

15. The invention of claim 14, wherein at least some of said "peripheral data" is added at said post processor means.

16. The invention of claim 15, wherein, upon transfer of said "peripheral data", said compression stage is made ready for the next stream of data bits.

* * * * *